United States Patent
Bouman (10) Patent No.: US 12,522,087 B2
(45) Date of Patent: Jan. 13, 2026

(54) CHARGING SYSTEM FOR ELECTRIC VEHICLES

(71) Applicant: ABB E-MOBILITY B.V., Delft (NL)

(72) Inventor: Crijn Bouman, The Hague (NL)

(73) Assignee: ABB E-Mobility B.V., Delft (NL)

( * ) Notice: Subject to any disclaimer, the term of this patent is extended or adjusted under 35 U.S.C. 154(b) by 694 days.

(21) Appl. No.: 17/656,377

(22) Filed: Mar. 24, 2022

(65) Prior Publication Data

US 2022/0212551 A1 Jul. 7, 2022

Related U.S. Application Data

(63) Continuation-in-part of application No. 15/933,757, filed on Mar. 23, 2018, now Pat. No. 11,801,761,
(Continued)

(30) Foreign Application Priority Data

May 19, 2010 (NL) ..................................... 2004746

(51) Int. Cl.
| | | |
|---|---|---|
| H02J 7/00 | (2006.01) | |
| B60L 53/10 | (2019.01) | |
| B60L 53/20 | (2019.01) | |
| B60L 53/302 | (2019.01) | |
| B60L 53/53 | (2019.01) | |
| B60L 53/55 | (2019.01) | |
| B60L 53/56 | (2019.01) | |
| B60L 53/63 | (2019.01) | |
| B60L 53/67 | (2019.01) | |
| H02J 1/08 | (2006.01) | |
| H02J 1/10 | (2006.01) | |
| H02J 1/12 | (2006.01) | |
| H02J 5/00 | (2016.01) | |
| H02J 7/02 | (2016.01) | |

(52) U.S. Cl.
CPC ............... *B60L 53/11* (2019.02); *B60L 53/20* (2019.02); *B60L 53/302* (2019.02); *B60L 53/53* (2019.02); *B60L 53/55* (2019.02); *B60L 53/56* (2019.02); *B60L 53/63* (2019.02); *B60L 53/67* (2019.02); *H02J 1/084* (2020.01); *H02J 1/106* (2020.01); *H02J 1/12* (2013.01); *H02J 5/00* (2013.01); *H02J 7/00* (2013.01); *H02J 7/0019* (2013.01); *H02J 7/02* (2013.01); *H02J 2310/48* (2020.01); *Y02E 60/00* (2013.01); *Y02T 10/70* (2013.01); *Y02T 10/7072* (2013.01); *Y02T 10/92* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01)

(58) Field of Classification Search
None
See application file for complete search history.

(56) References Cited

U.S. PATENT DOCUMENTS

2002/0174796 A1\* 11/2002 Kumar ................ B60L 15/2045
105/26.05

\* cited by examiner

*Primary Examiner* — Arun C Williams
(74) *Attorney, Agent, or Firm* — McCarter & English, LLP (57) ABSTRACT

A charging system for electric vehicles is disclosed, which includes at least one charging port with an interface for power exchange with at least one electric vehicle, and at least one power converter for converting power from a power source such as a power grid to a suitable format for charging the vehicle. The power converter can be at a remote location from the charging port, such as a separate room, and/or a separate building.

20 Claims, 10 Drawing Sheets

Related U.S. Application Data which is a continuation of application No. 13/678,073, filed on Nov. 15, 2012, now abandoned, which is a continuation of application No. PCT/NL2011/050341, filed on May 18, 2011.

CHARGING SYSTEM FOR ELECTRIC VEHICLES

RELATED APPLICATION(S)

This application is a continuation-in-part of U.S. patent application Ser. No. 15/933,757, filed on Mar. 23, 2018; which is a continuation of U.S. patent application Ser. No. 13/678,073, filed on Nov. 15, 2012; which claims the benefit of priority to patent application Serial No.: PCT/NL2011/050341, which was filed on May 18, 2011; and which claims priority to Dutch Application Serial No. 2004746, filed on May 19, 2010. The entire contents of these applications are hereby incorporated by reference in their entireties.

FIELD

The present disclosure relates to a charging system for electric vehicles, and for example, a setting wherein multiple vehicles can be charged, such as, at a filling station for vehicles with combustion engines.

BACKGROUND

With a growing popularity of electric vehicles, the need for charging stations increases, and so does the total power available for each charging port, and in case of multiple ports, their total power consumption.

Large power consumption uses power converters with increasing power capacity, and as a result, larger cooling facilities can be used to prevent damage from overheating of their components. With a (forced) cooling facility for each energy exchange port, the charging system (or charging station) would become a noisy environment, with a low energy efficiency. Thus, the present disclosure provides a charging system with multiple ports for this purpose.

Charging stations with a plurality of charge ports are known. One way of implementing a plurality of charge ports can be by using an AC/DC converter followed by a DC bus where the charge ports are connected to. However, in such an arrangement, multiple vehicles cannot be charged simultaneously, because each vehicle can have a different inlet voltage. To be able to charge electric vehicles simultaneously DC/DC converters are placed before each charging port, which can increase the cost of the multipart charging station.

SUMMARY

A charging system for electric vehicles is disclosed, comprising: a plurality of charging ports, each with an interface for power exchange with at least one electric vehicle; a plurality of power converters for converting power from a power source to a desired format for charging the vehicle; a switchable connection matrix for connecting at least one power converter to at least one charging port; at least one controller for controlling at least one of the power converters, and/or for controlling the switching operations of the connection matrix and at least one power converter; and communication means for exchanging parameters with the at least one electric vehicle.

A method for operating a switchable connection matrix is disclosed, comprising: (a) assigning for connecting at least one power converter at least one charging port having an interface for power exchange with a vehicle, the method for charging a vehicle to a priority to each charging port based on at least one parameter; (b) determining power requested on each charging port; (c) distributing power modules among the charging ports based on the priority and the requested power; and (d) repeating steps of (a)-(c).

BRIEF DESCRIPTION OF THE DRAWINGS

The disclosure will be explained hereinafter on the basis of the exemplary embodiments illustrated in the drawings, in which.

DETAILED DESCRIPTION

In accordance with an exemplary embodiment, a multiport (at least one, for example, several ports) system is disclosed, which can improve functionality with less hardware, and which can be relatively easier and cheaper to upgrade with extra connections.

In accordance with an exemplary embodiment, a charging system for electric vehicles is disclosed, which includes a plurality of charging ports, each of the plurality of charging ports having an interface for power exchange with at least one electric vehicle, a plurality of power converters for converting power from a power source such as a power grid to a suitable format for charging the vehicle, a switchable connection matrix for connecting at least one power converter to at least one charging port, at least one controller for controlling at least one of the power converters, and/or for controlling the switching operations of the connection matrix and the power converter, and communication means, for exchanging parameters with the at least one electric vehicle.

In an exemplary embodiment, the power converters and the connection matrix are at a remote location from the charging port, for example, a separate room and/or a separate building.

In accordance with another exemplary embodiment, by having the power converter at a remote location it can be relatively easier to upgrade the system with more power (no digging needed), the energy exchange ports are relatively easier to fit into a user situation, and there are less technical requirements, for example, regarding size, on the power converter, if it is placed in a conditioned room. The charging location will also not be disturbed during the expansion of the charging capacity.

For example, the switchable connection matrix can be implemented in order to couple each charging port simultaneously to a number of the plurality of converters, in such a way that at most one port is connected to a converter. For example, the matrix allows each charging port to be connected simultaneously to one or more power converters, or none. In exemplary embodiments, the converters can be connected to at most one charge port at the same time.

The present disclosure also provides that the power converters, matrix and the charge ports can be expanded independently from each other, and the number of charge ports and power modules do not have to be equal when the charge station is expanded. For example, a charge station may be installed at a location and can be expanded or even downgraded depending on how frequently the charge station is used. For example, one scenario could be that the charge station is not used very frequently, and because it is at a remote location from other stations the vehicles that arrive will have low state of charge. In this case, a charge station with one charge port and a high power capacity is needed. For example, through time a new city is built nearby, which can result in more electric vehicles visiting the charge post with a medium state of charge.

Accordingly, it would be desirable to modify the charge station then into a configuration with more charge posts and with the same or a smaller power capacity. For example, the present disclosure can be used within the setting described in the Dutch patent application NL 2004279, which is incorporated by reference in its entirety, which will enable the disclosure to log the charging sessions. Based on the logged charging sessions the server can decide to change the power capacity or the number of charging ports. The present disclosure also provides that the charging ports do not have a common ground, which provides that when more than one electric vehicle can be connected to the charger they will be galvanicly isolated, which is often desired by the EV manufacturers. In addition, galvanic isolation between the vehicles having more than one isolation monitor in the same circuit can decrease the sensitivity of the isolation monitor.

In accordance with an exemplary embodiment, at the energy exchange port, where the user charges his vehicle, there can be less noise, visual disturbance or (warm) air inconvenience.

In accordance with another exemplary embodiment, the system according to the disclosure can become more efficient when the remote location comprises a plurality of power converters. For example, the converters share (part of) the cooling system and location, they can be designed modular, and the total converter can be fit to the total power needed for all of the ports.

In an exemplary embodiment, the remote location comprises climate conditioning, such as an air- or a liquid based cooling system, a heat pump system and/or a heat exchange system, which removes heat away from the power converters, or to heat systems inside the conditioned room if the temperature drops below a certain threshold. The cooling system may be a fan that blows air in or out of the conditioned room. Also the cooling system may be a two-part system, such as a heat-pump system. The heat can be extracted from the power converters or the room and transported (e.g. by fluid or air) to a second part of the cooling system outside the conditioned room. For example, in this way the power converter system can be upgraded easier.

In accordance with another exemplary embodiment, such a second part of the heat-pump system serves to exchange the heat with the outside world, and can be on top of a charging station's roof or a building (shop) near the charging station to prevent noise and hot air to annoy users.

For example, the cooling may be a part of or placed on a transformer house. The heat from the power converters can be used for other purposes, such as heating of a building or heating of water. The heat may be transferred into storage, such as a hot water tank or an under-ground heat storage.

The conditioned room may be an industrial cabinet, a building, a part of a building or a service room (e.g., only accessible to authorized personnel), or it may be that the conditioned room is not accessible through a door or has a door with a lock.

For example, the term conditioned here means amongst others that it can be shielded against at least rain or sun. The conditioned room may be one or more transformer houses/buildings. The conditioned room may have separate compartments for the grid connected transformer and the power converters or a transformer house may be used without the transformer. Also two houses can be used, one with a transformer and another with the power converters.

The conditioned room may be, for example, at least 2 metres away from at least one of the posts. The conditioned room may be under ground, on a roof and it may be characterized by the fact that it provides a shell that increases International Protection rating (as defined in international standard IEC 60529) of the system. For example, this may be because openings in the conditioned room's walls are smaller than openings in the power converters or that there is a spacing between the power converters and the conditioned room's walls to prevent people from touching the power converters.

The conditioned room may comprise an air-conditioning system and/or a heater. A high efficiency can be obtained when the climate conditioning is configured for direct operation on the converter or converters, rather than the entire room. The remote location may be a transformer house or form part thereof, and the converter(s) and the transformer may be located in separate rooms within the remote location.

Alternatively, the power converters may be placed outside or in case of a plurality of energy exchange ports, inside one of the ports or below (in the fundament of) one of the charging ports. For example, the term port can be used here to indicate both the functionality of exchanging energy with a vehicle, as the physical device, standing at the charging station.

The power converters may be unidirectional or multidirectional converters with one or more AC or DC inputs and one or more AC or DC outputs. In an exemplary embodiment these outputs can be independently controlled. For example, in the case of a single power converter the power converter will have at least two outputs. In the case of multiple power converters, the outputs of the converters will be connected to a connection matrix. The connection matrix has multiple inputs and multiple outputs. Various configurations of suitable power converters for the system according to the present disclosure are described in the Dutch patent application NL 2004279 by the same applicant, which is hereby incorporated by reference in its entirety.

The conditioned room may also contain one or more energy storage systems such as battery systems, capacitor systems, flywheels or any other system which can store energy. For example, these energy storage systems can be coupled to the power converters to deliver temporary peak power or to store electricity at a convenient moment. In an exemplary embodiment, the cooling system present in the conditioned room can be used to cool or heat the energy storage system or to maintain it at a certain defined temperature. For example, this can be beneficial for the life of the storage medium, especially in the case of batteries. The conditioned room or systems present in the conditioned room may also be heated when the temperature drops below a certain threshold.

In an exemplary embodiment, a number of power converters can be coupled to a number of charging ports by a switchable connection matrix, which may be located within the remote location. Such a connection matrix is also described in more detail in the Dutch patent application NL 2 004 279, which is hereby incorporated by reference it its entirety.

In an exemplary embodiment, the connection matrix has four output connections and can be designed to transfer a certain maximum amount of power per connection, for example, 50 kW. At the same time one power converter may be designed to deliver a maximum amount of power, for example, also 50 kW. When operational in the field, the matrix will receive a maximum, for example, of 50 kW from the converter and will distribute this 50 kW over the 4 outputs. When the power converter is upgraded by adding a second converter, also for example, with a power of 50 kW resulting in a 100 kW combined power. For example, the power limit of the connection matrix still remains 50 kW per connection. However, in this case, only the average power delivered by the 4 outputs will increase.

In another exemplary embodiment of above situation one can also upgrade the connection matrix to deliver more power per output, for example, 100 kW. This may be done by adding and/or replacing components (such as fuses) inside the connection matrix, or by totally replacing the connection matrix.

The charging system according to any of the above described embodiments, may comprise a controller, which is operated to control the amount of heat generated, in case the heat can be used for other purposes. Charging speeds of batteries may for instance be increased temporarily when heat, for example, in the form of hot water, may be needed by an external system. For example, the generated heat in that case can be controlled by controlling the output power.

Such a controller may be coupled to the converter(s), the connection manager(s), the connection matrix(s), and the energy storage system via the internet. The controller may optimize and influence the power flow to each output of the connection matrix based on local decision rules.

Furthermore, it may be equipped with at least one connection manager, said connection manager being configured to control safety settings of energy supply to at least one port. In accordance with an exemplary embodiment, each port comprises a connection manager, for example, one connection manager can serve a plurality of energy exchange ports.

The connection manager can be used to adapt a charging port for a charging standard such as CHAdeMO or J1772. For example, safety systems and communication hardware may be included in the communication manager. Such a connection manager can also be described in more detail in the Dutch patent application NL 2 004 350 by the same applicant, which is incorporated herein by reference in its entirety.

In accordance with an exemplary embodiment, the total system may also contain a special system or method to compensate for the length of the cable between the remote charging post and the conditioned room. As wires get longer the system can experience negative effects such as voltage drop over the cable. For example, the use of cables with a large diameter can be used to address the voltage drop over the cable. In some situations this may not be preferred because of the extra cost of thicker cables. Therefore another method could be used such as the use of a control system which controls the output voltage of the power converters based on the measured voltage close to the charging ports. For example, this could be implemented via a measurement device inside or close to the charging post, or even via a data communication link to a measurement device inside the vehicle, such as a BMS system.

In accordance with another exemplary embodiment, the method for operating the switching matrix comprises steps of assigning a priority to each port based on at least one parameter, determining the power requested on each port, distributing the power modules among the ports based on the priority and the requested power, repeating the aforementioned steps each time an event occurs.

In accordance with an exemplary embodiment, execution of the above mentioned method can be as follows. Each time an event occurs the controller starts with assigning a priority to each port of the charging station based on a parameter. Some non-limiting examples of an event are a vehicle which connects to or disconnects from a charging station, the power demand of the vehicle which changes substantially during the charging or when the user changes the charge preferences. For example, the parameter can be the time of arrival of the vehicle, the type of account the vehicle driver possesses, the time entered in the system by the user for preferred drive away. In accordance with an exemplary embodiment, the power requested on each port can be determined by the controller. The power modules are distributed among the ports based on the priority and the requested power by the ports.

An exemplary embodiment of a scenario wherein the above mentioned method can be applied is as follows. Vehicles couple to a charging station one by one. The vehicle which came the first gets the highest priority, and the vehicle which came the last the lowest priority. Based on the priority the first vehicle gets sufficient power modules to satisfy its power demand, the remaining modules (if there are any) are assigned to the other ports (vehicles) based on their priority.

In another exemplary embodiment, only a part of the modules are distributed according to the priority. For example, a number of the modules are distributed equally among the ports, the remaining modules are assigned according to the priority.

Figure 1A:
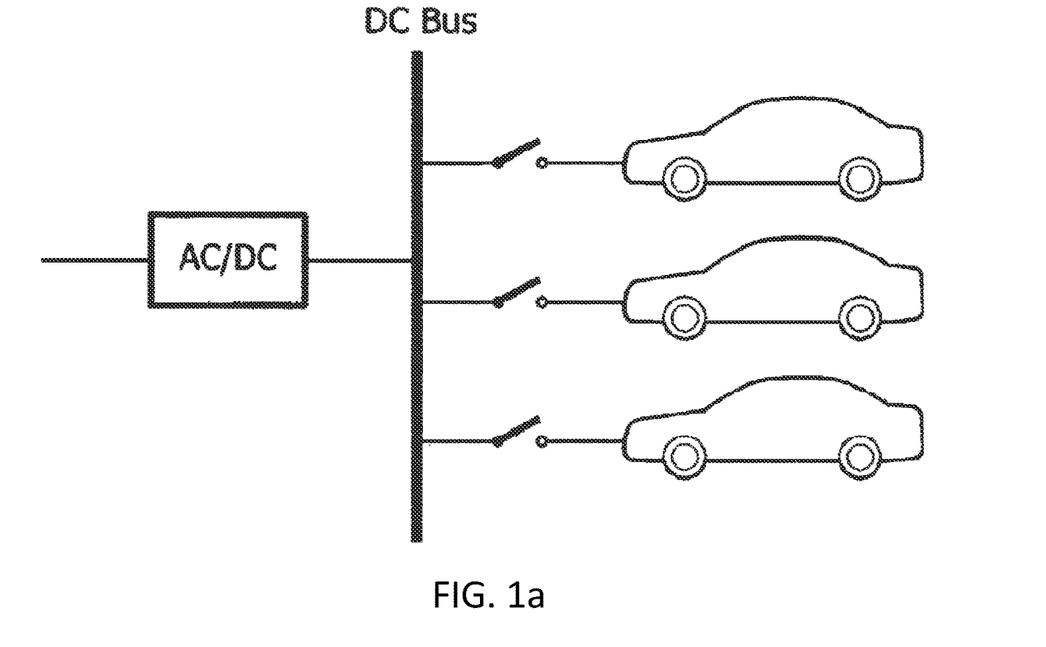
FIG. 1a shows a known charging station with a plurality of charging ports.
Figure 1B:
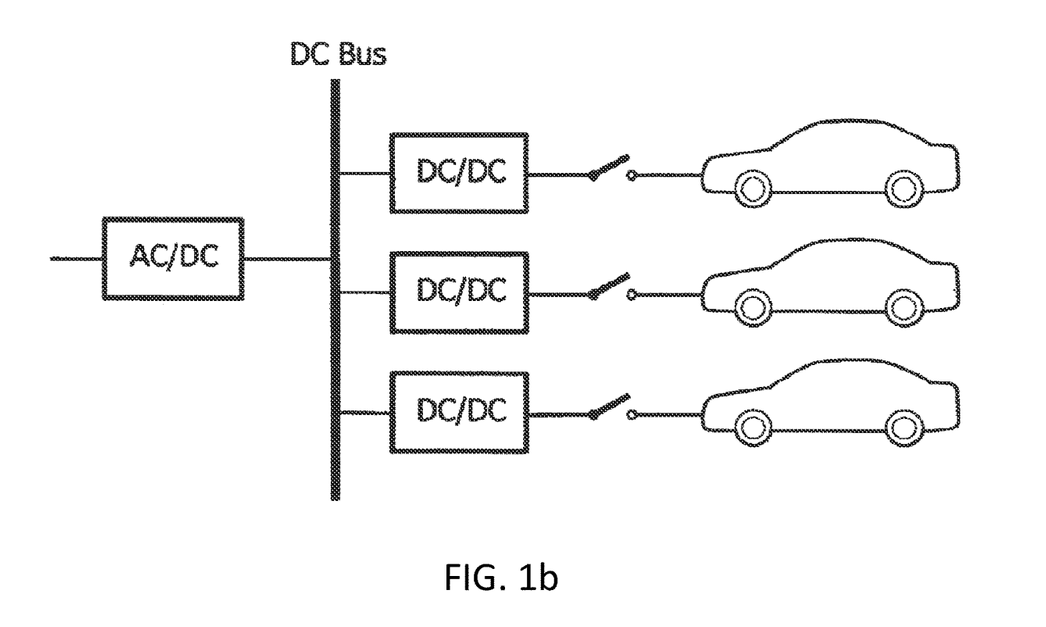
FIG. 1b shows a known charging station with a plurality of charging ports with different inlet voltages simultaneously.

FIG. 1a shows a charging station with a plurality of charge ports from known systems. The charging station, includes (e.g., consists of) an AC/DC converter followed by a DC bus and a plurality of switches are used where the charge ports and hence the vehicles are connected to. However, in the system as shown in FIG. 1a, multiple vehicles cannot be charged simultaneously, because each vehicle has a different voltage on its charging inlet. The known DC/DC converters used to charge electric vehicles with different inlet voltages simultaneously (FIG. 1b), can increase the cost of the multiport charging station.

Figure 1C:
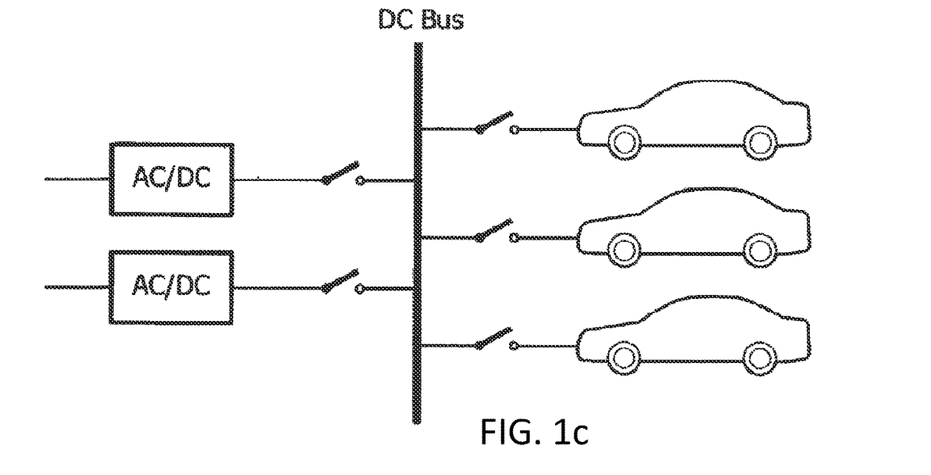
FIG. 1c shows a known charging station with multiple power converters.

FIG. 1c shows a charging station with multiple power converters from known systems. Although the power converter is modular and the power capacity can be expanded, multiple electric vehicles cannot be simultaneously charged.

Figure 1D:
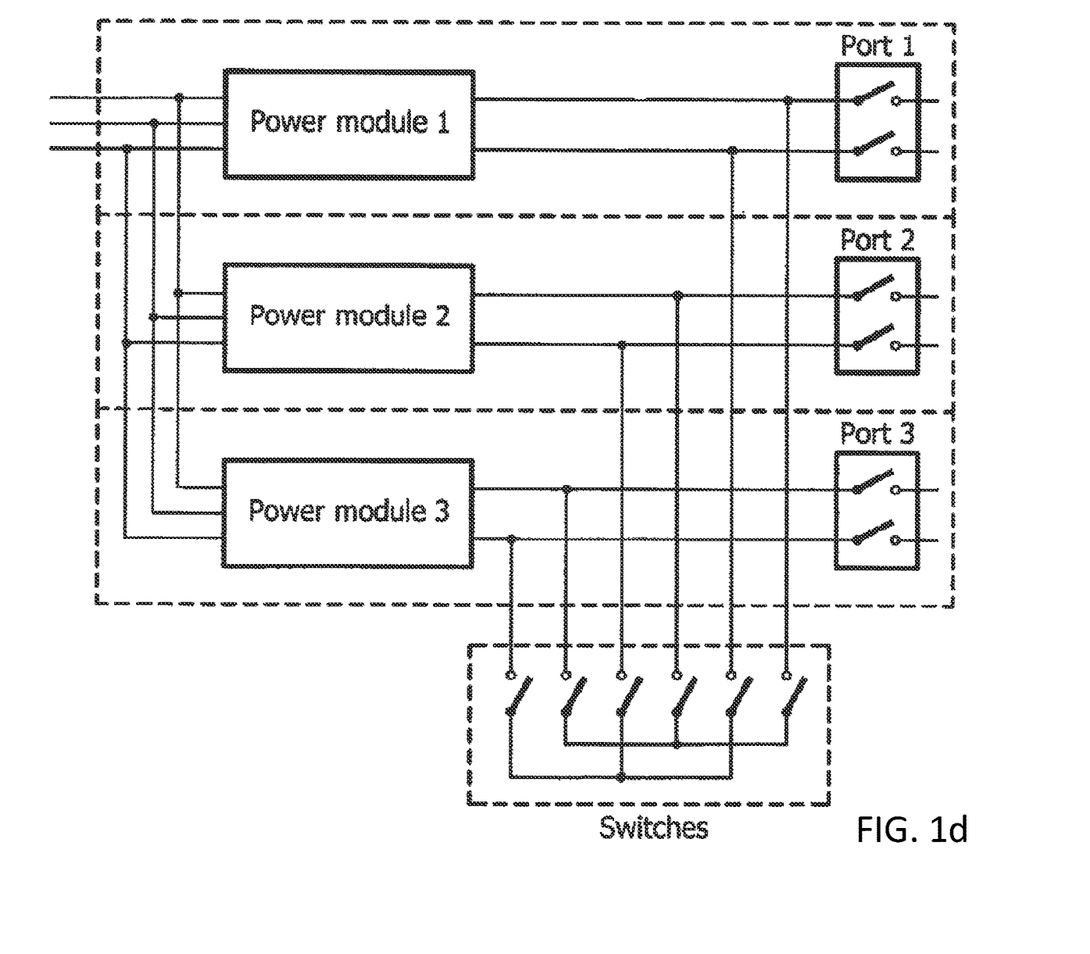
FIG. 1d shows a known multiport charging station.

FIG. 1d shows a multiport charging station known, wherein electric vehicles can be simultaneously charged from this charging station, since the hardware configuration of the number of charge ports are equal to the number of power modules.

Figure 2:
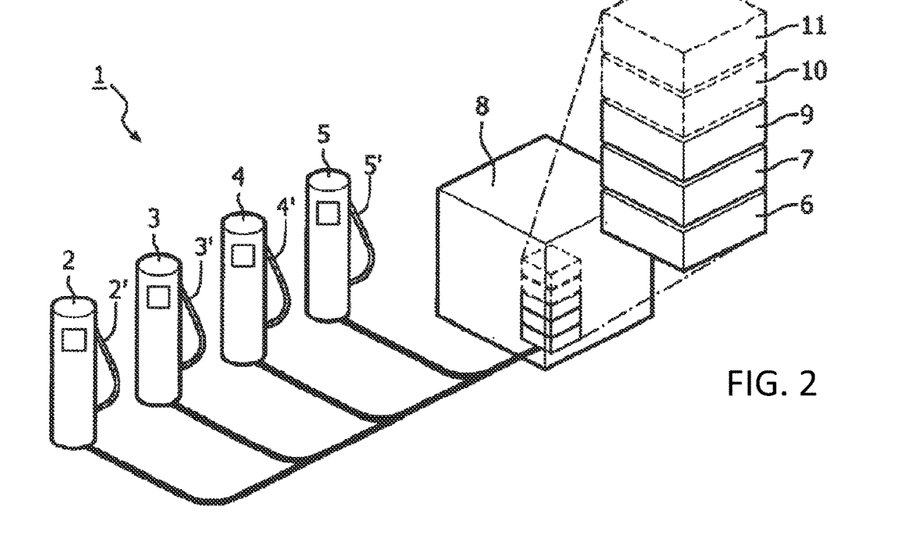
FIG. 2 shows an exemplary embodiment of a charging system according to the present disclosure.

FIG. 2 shows a first exemplary embodiment charging system 1 according to the present disclosure, comprising charging ports 2-5 with an interface 2'-5' for power exchange with at least one electric vehicle, power converters 6, 7, for converting power from a power source such as a power grid (not shown) to a suitable format for charging the vehicle. The power converters are at a remote location 8 from the charging ports 2-5, formed by a separate building 8.

The building 8 can include a connection box 9, which may comprise a plurality of connection managers, as well as vacancies 10 and 11, intended for future use, for example, when the power needed increases. In accordance with an exemplary embodiment, the charging system can be extended without modifications to the energy exchange ports.

Figure 3:
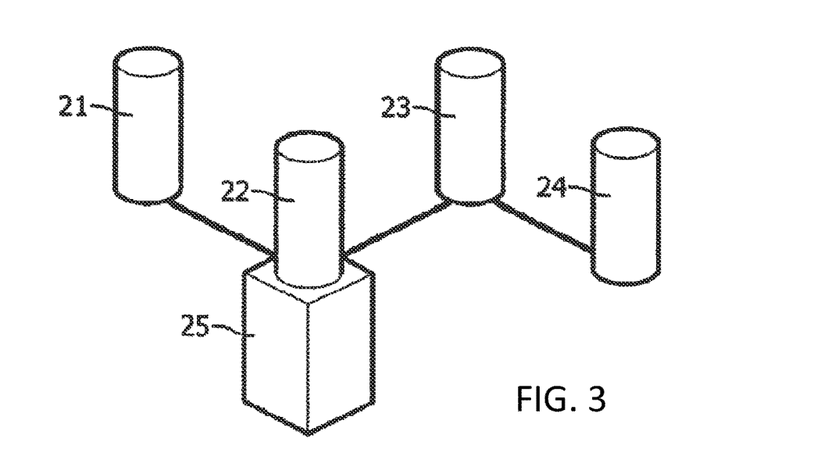
FIG. 3 shows another exemplary embodiment of a charging system according to the present disclosure.

FIG. 3 shows another exemplary embodiment 20 of a charging system according to the present disclosure, comprising energy exchange ports 21-24, wherein a power converter 25 can be located below one of the energy exchange ports 22.

Figure 4:
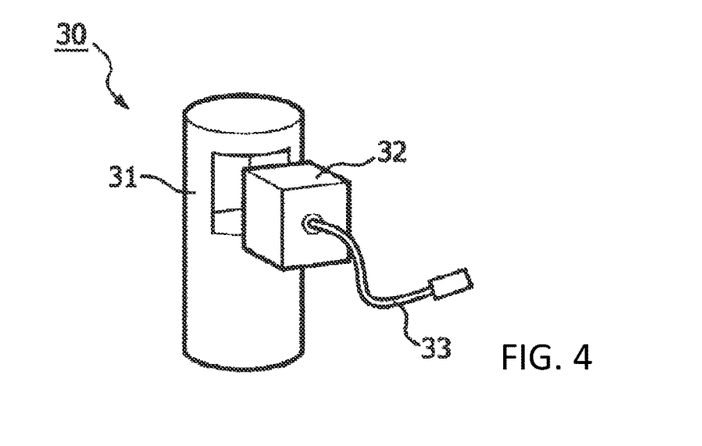
FIG. 4 shows another exemplary embodiment of a charging system according to the disclosure.

FIG. 4 shows an exemplary embodiment 30, wherein connection managers are placed inside a connection box 32 within the charging port 31, which connection box 32 also includes a controller. In accordance with this embodiment, the connection box 32 can be replaced entirely in case of an upgrade, for example, increasing the amount of connection managers. In addition, because the controller can be directly associated with the connection managers, the controller can be pre-programmed to cooperate with the correct number of connection managers.

Figure 5A:
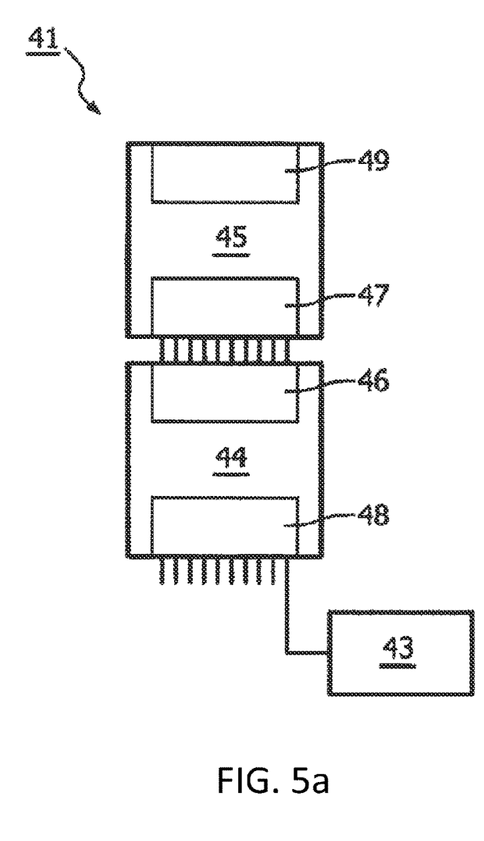
FIGS. 5a-5d show schematic views of an exemplary power system according to the present disclosure.

FIG. 5a shows an embodiment 41 of a charging port 43, to which a connection box 44 can be coupled via an interface 48. The connection box 44 comprises a second interface 46 which can be coupled with a corresponding interface 49 of a power converter 45. The power converter includes an interface 49 for coupling an additional power converter in case more power is needed.

Figure 5B:
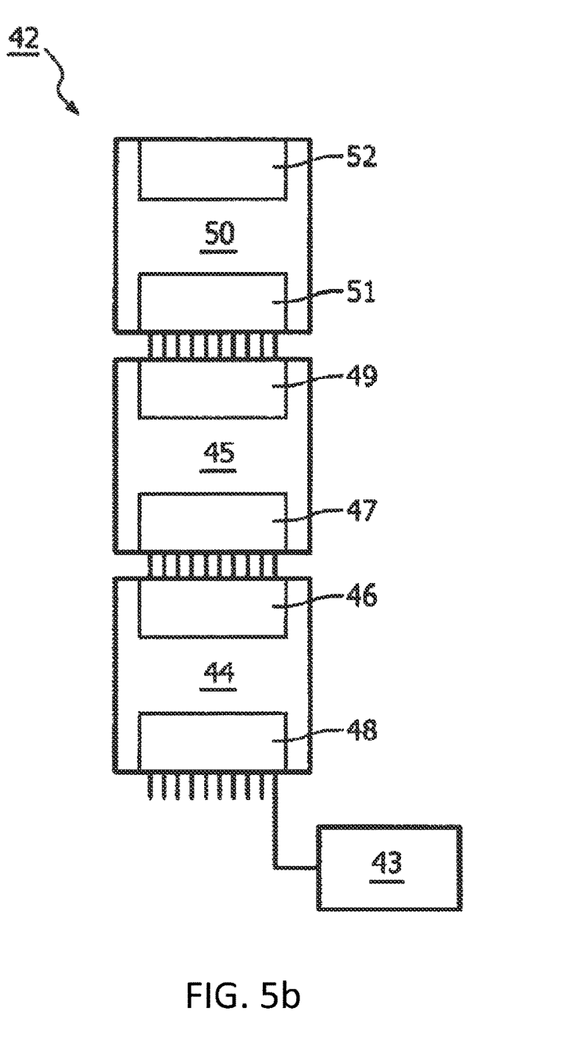

FIG. 5b shows an embodiment 42 of the charging port 43 from FIG. 4a, which is now equipped with an additional power converter 50. The power converter 50 comprises an interface 51, and it furthermore can include an interface 52 for future coupling of further power converters.

Figure 5C:
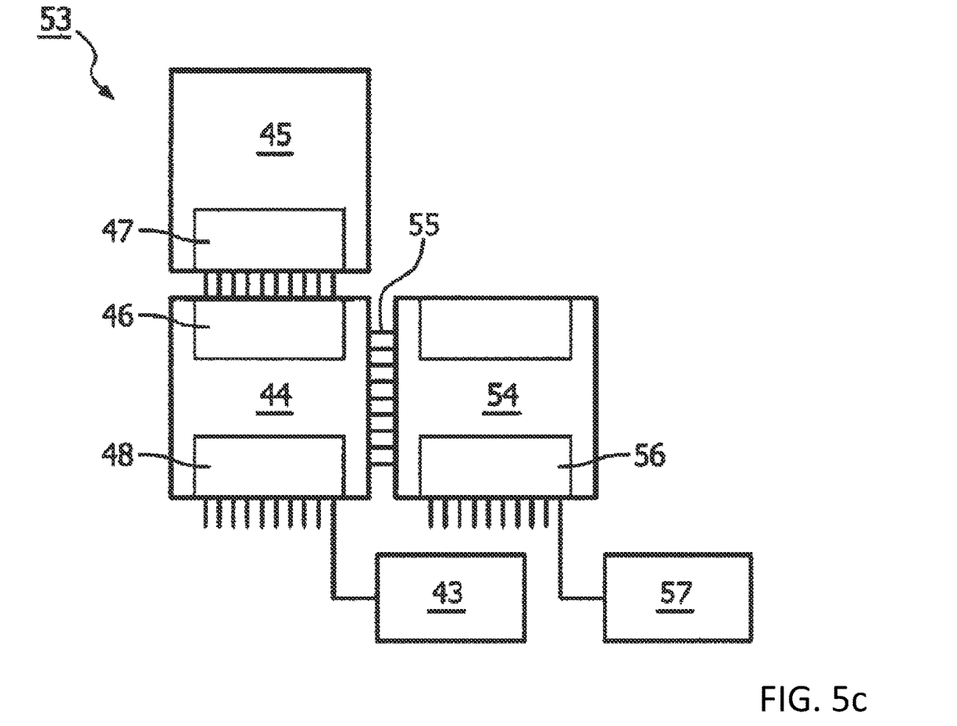

FIG. 5c shows another exemplary embodiment, wherein a second charging port 57 is present, which is coupled to an interface 56 of a second connection box 54, which is coupled 55 to the first connection box 44. In accordance with this embodiment, two charging ports 43, 57 can be powered by the same power converter 45.

Figure 5D:
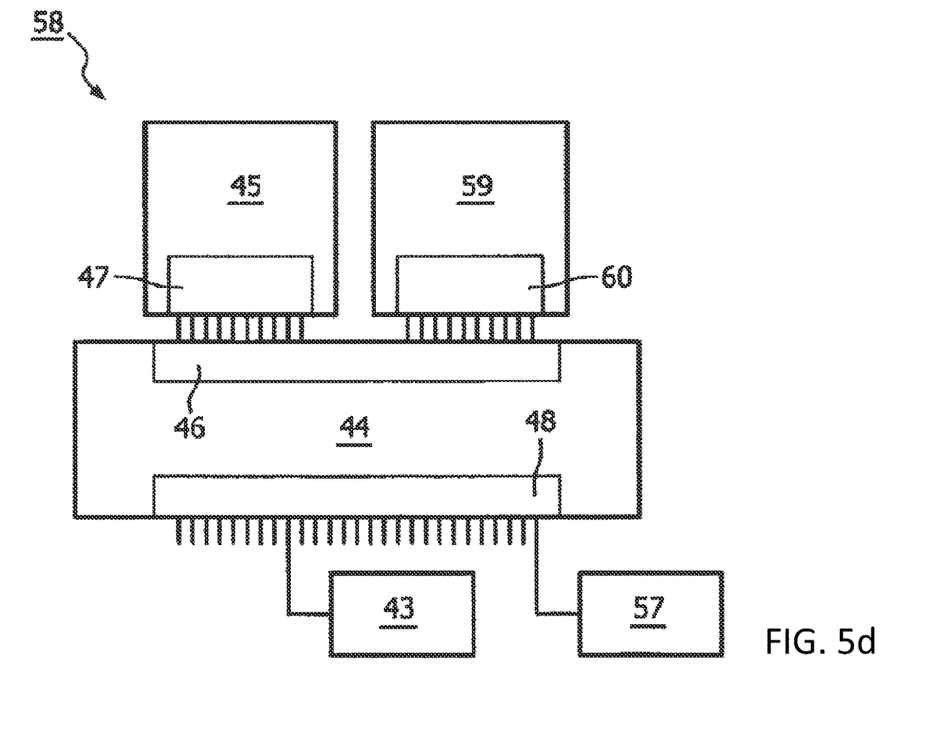

FIG. 5d shows still another exemplary embodiment, wherein charging ports 43 and 47 are both coupled to interface 48 of connection box 44, and can be switched to either power converter 45 or 59, which are coupled to the connection box 44 by respective interfaces 47, 60 and 46.

Figure 6A:
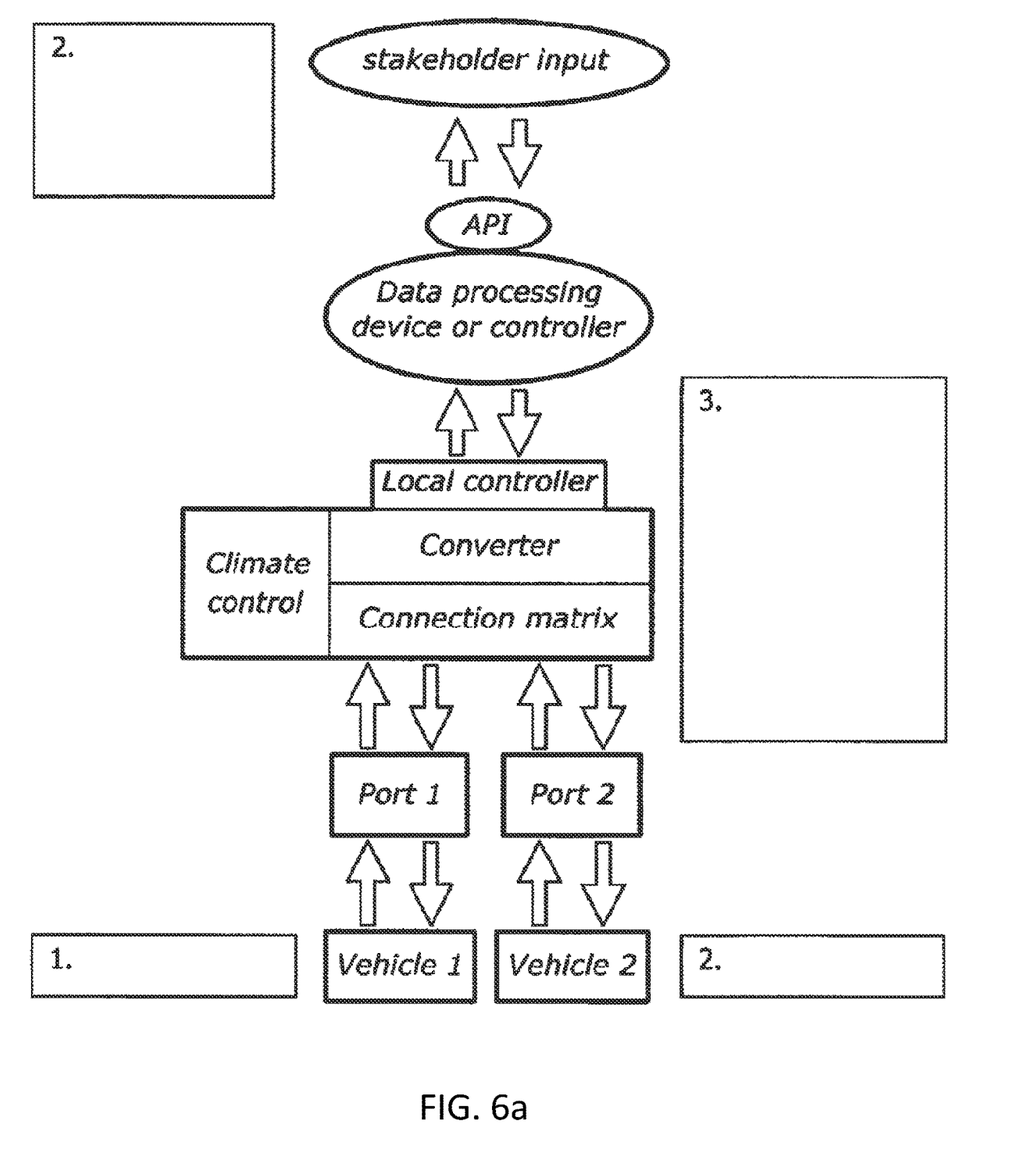
FIGS. 6a and 6b show flowcharts of an exemplary process flow according to the disclosure.

FIG. 6a shows an exemplary embodiment with a flow-chart of use of the present disclosure. Firstly, a vehicle connects to energy exchange port 1. Secondly, a second vehicle connects to energy exchange port 2. At the same time, the stakeholder sends information to a data processing device or controller. For example, the stakeholder input can be battery data, grid data, service needs, etc. Thirdly, the data processing device together with controllers in the system decide on the best charging strategy and power distribution based on parameters such as the stakeholder input, the maximum power and specifications of the converter, the specifications of climate control, the specifications of the connection matrix, the specifications of the port, and the data known about the vehicles or their batteries and potential other data.

Figure 6B:
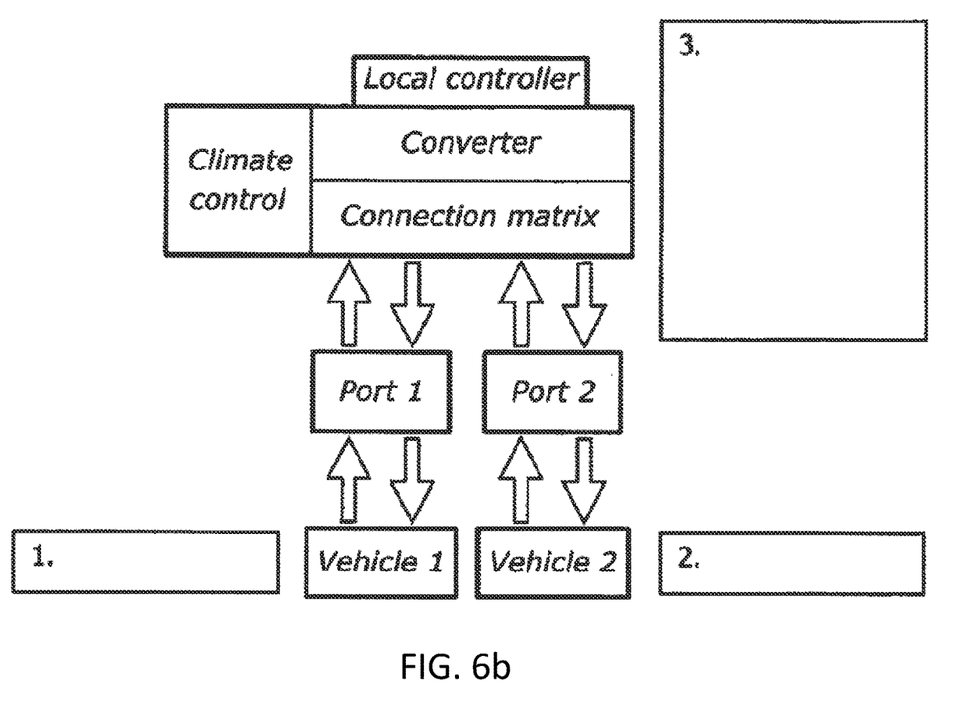

FIG. 6b shows another exemplary embodiment, wherein firstly a vehicle connects to the energy exchange port. Secondly, a second vehicle connects to the energy exchange port. Thirdly, the local controller in the system decides on the charging strategy and power distribution based on parameters such as the maximum power and specifications of the converter, the specifications of the connection matrix, the specifications of the climate control system, the specifications of the port, and the data known about the vehicles or their batteries and potential other data.

The connection manager may be part of the charging post. The connection manager and the cable and connector can be removed from the charging post to be replaced in one piece. When using a multiple output power converter system, with a lesser amount of charging posts, multiple outputs may be connected to a single connection manager. When upgrading to a higher number of charging posts, some of the connection may be split. In some cases a single connection manager can be connected to multiple charging posts or a single connection manager can be connected to a single charging post that has multiple connections (charge cable and charge connector).

In accordance with an exemplary embodiment, the charging post can be located at a distance from the power converters. For example, the charging posts can be placed next to one or more (parking) spots for vehicles, such as, at a fuel station/charging station or a shop. The charging posts can be indoors (e.g. parking garage). The charging post can be powered (from the power converters) from the bottom or from the top (not shown in image). Additionally AC power, for example for electronics inside the charging post or for an AC-charging outlet, may be available through the same or another connection.

The charging post can have a cable handling system and a feature to place the connector in a safe and dry location.

In accordance with another exemplary embodiment, a subsystem, such as a user-interface, payment terminal, user identification system, user input system or digital transmission system may be connected to communication line that is a part of the cable(s) that is connected to the charge post.

The energy exchange port can have one or multiple charge connectors, where the connectors may deliver either AC or DC charging current or both.

Figure 7:
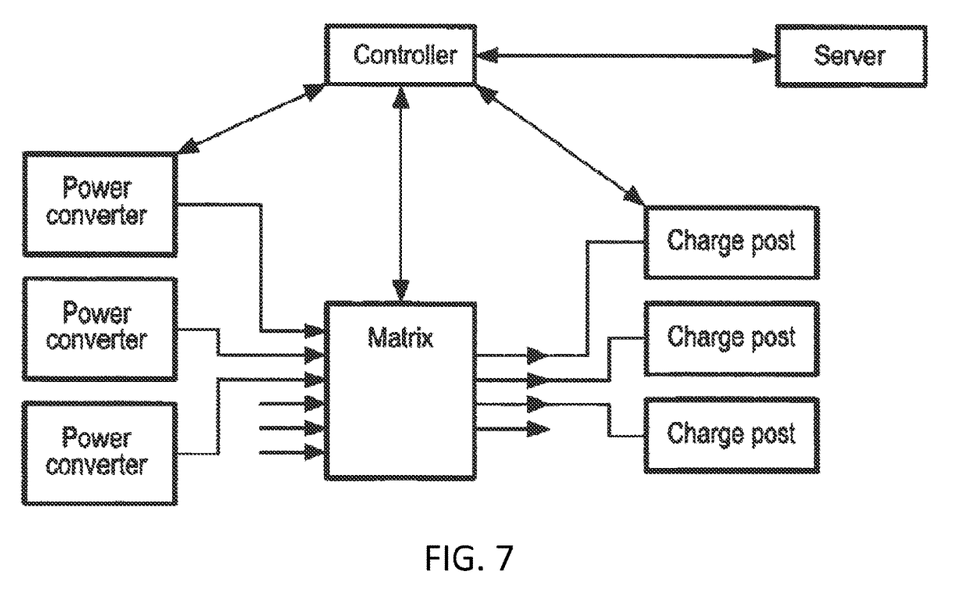
FIG. 7 shows another exemplary embodiment of the charging station.

FIG. 7 shows a charging system wherein a plurality of power converters are connected with charge ports by a switched connection matrix. By using a switched connection matrix multiple electric vehicles can be charged simultaneously, without the need of extra converters. The connection matrix can be controlled by a controller. Information about the charge session can be sent from the charging station to the server, whereupon the server can decide for expansion or downgrading the charging station. For example, the server or the controller can decide to switch off each of the converter modules or charging ports in case of malfunction.

Figure 8:
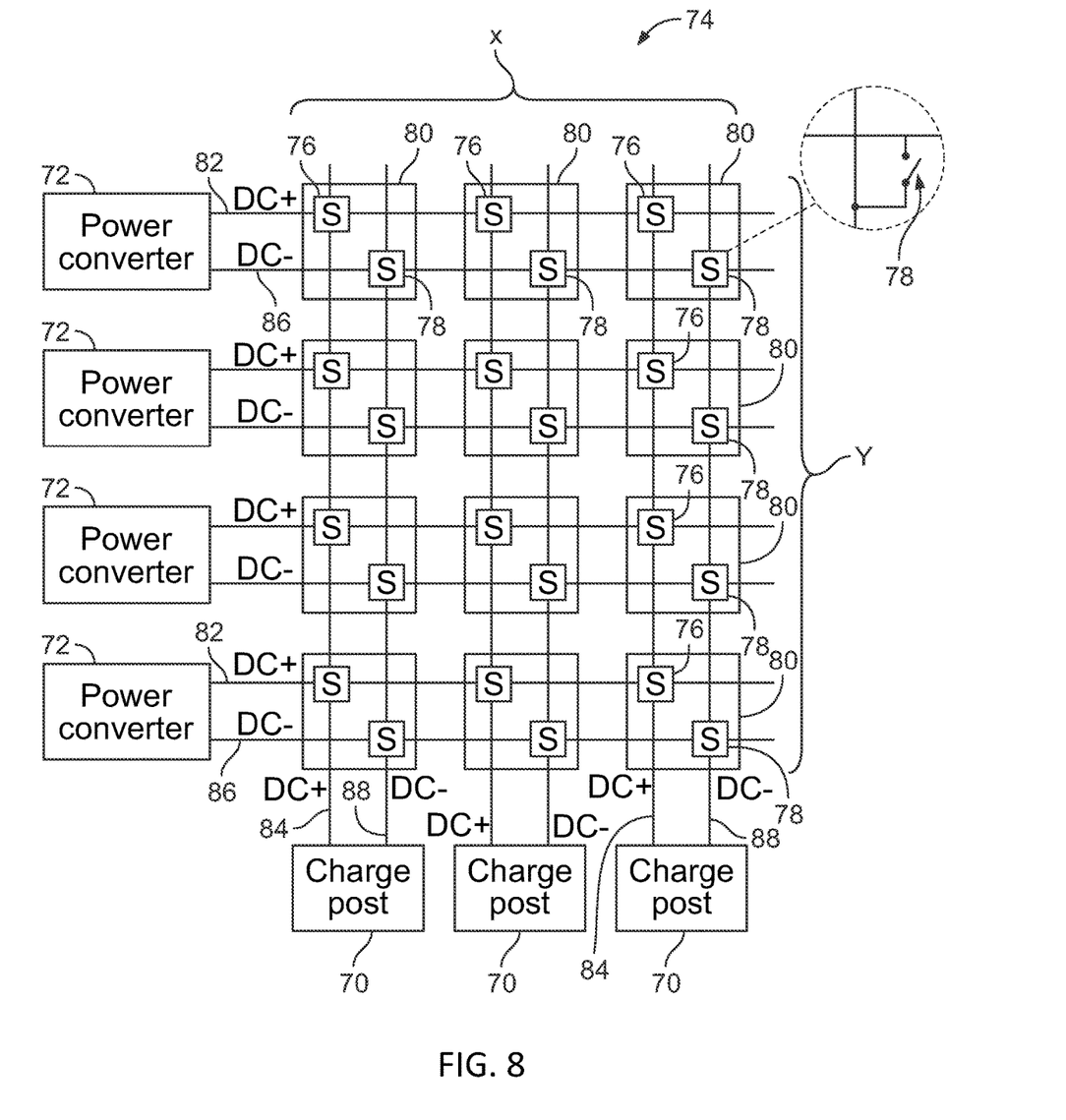
FIG. 8 shows a further exemplary embodiment with an exemplary implementation of the connection matrix.

FIG. 8 shows an exemplary embodiment of the connection matrix 74 placed between the power converters 72 and the charge posts 70. By closing the switches 76, 78 one or more power converters 72 can be connected to a charge post 70. For example, the matrix 74 can charge a plurality of electric vehicles simultaneously without extra DC/DC converters 72. To expand the number of power converters 72 or the charge posts 70, the matrix 74 also can be expanded. The matrix 74 can be extended by adding switch modules 80 each containing two switches 76, 78 which are controlled by a local controller. As shown in FIG. 8, the connection matrix 74 may be a grid of switches 76, 78. The grid may be defined by a first number X of switches 76, 78 that equals the number of charging ports 70 and may be defined by a second number Y of switches 76, 78 that equals the number of power converters 72. Thus, in the embodiment of FIG. 8, the first number X is three and the second number Y. Therefore, the total number of switches 76, 78 in the grid (i.e., for a particular charge line 82, 86) can be determined by multiplying the first number X and the second number Y, which in the particular embodiment is 12 switches 76, 78 (for one of the charge lines 82, 86) or switch modules 80. As further shown in FIG. 8, each of the power converters 72 is connected to one set of the first number X of the switches 76, 78, with each switch 76, 78 in the set being connected to each other in series. Likewise, each of the charging ports 70 is connected to one set of the second number Y of the switches 76, 78, with each switch 76, 78 being connected to each other in series. Thus, each switch 76, 78 (or switch module 80) is connected to both the output 82, 86 of one power converter 72 and the input 84, 88 of one charge port 70, with the switches 76, 78 (or switch modules 80) in each set being connected to each other in series. As further shown, this arrangement allows the number of charging ports 70 to be different (i.e., unequal) to the number of power converters 72, which means that the first number X of switches 76, 78 may also be different from the second number Y of switches 76, 78 in corresponding fashion. It may also be desirable for each switch 76, 78 or pair of switches 76, 78 to be contained within a switch module 80, such that the number of switch modules 80 equals the number of switches 76, 78 or pair of switches 76, 78. Switches 76, 78 may be provided in one of the charge lines 82, 86 or in both charge lines 82, 86. For example, one grid of switches 76 may be DC positive switches 76 connected between the DC positive outputs 82 of the power converters 72 and the DC positive inputs 84 of the charging ports 70. Another grid of switches 78 may be DC negative switches 78 connected between the DC negative outputs 86 of the power converters 72 and the DC negative inputs 88 of the charging ports 70. Where a grid of DC positive switches 76 and a grid of DC negative switches 78 are provided, each DC positive switch 76 may be paired with a corresponding DC negative switch 78 and each pair of switches 76, 78 may be contained in a switch module 78.

Figure 9:
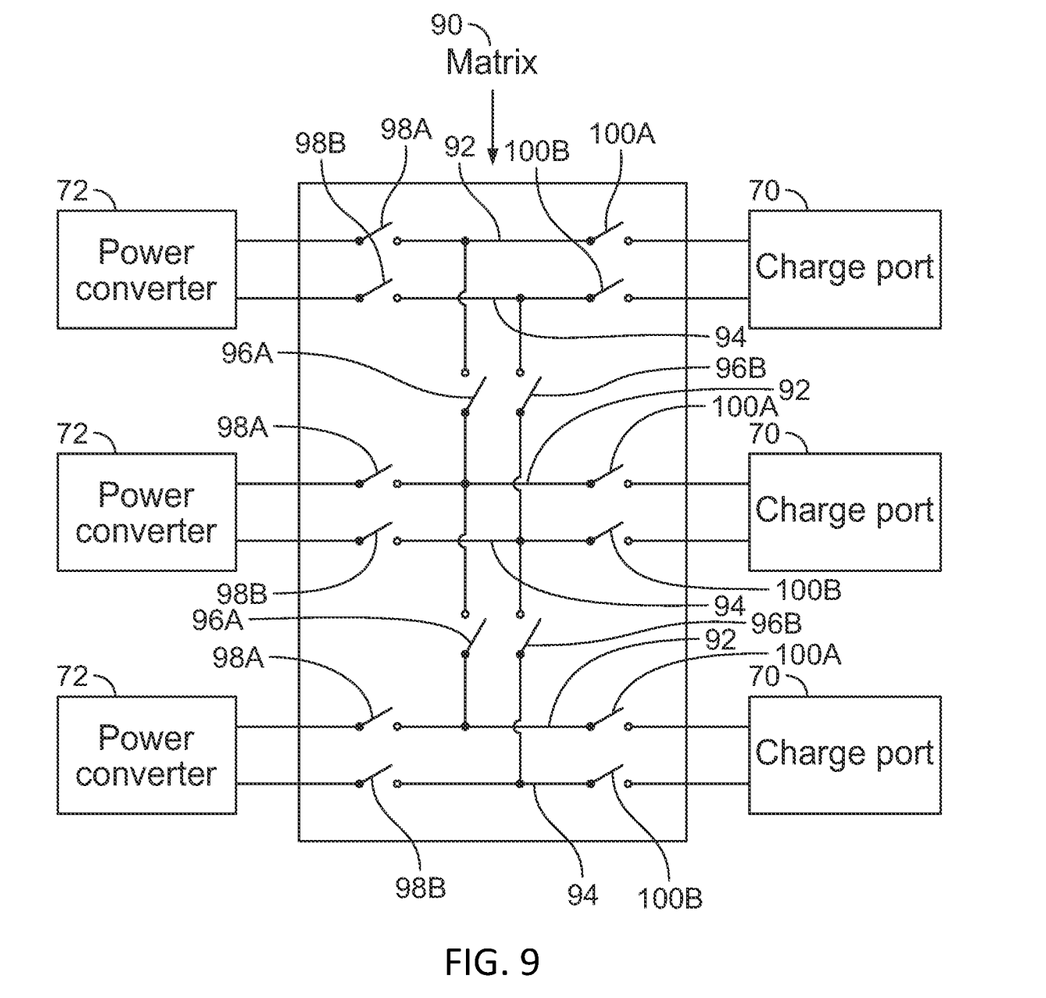
FIG. 9 shows another exemplary with an exemplary implementation of the connection matrix.

FIG. 9 shows another exemplary charging system wherein the power converters 72 are connected with the charge ports 70 by a different embodiment of the switched connection matrix 90. As shown in FIG. 9, the connection matrix 90 may have first bus segments 92 that are each connected between one power converter 72 and one charge port 70, such that each power converter 72 is connected to one of the charging ports 70 through one of the first bus segments 92. Further, each pair of adjacent first bus segments 92 may be connected together with a single switch 96A. Corresponding second bus segments 94 may also be provided, with each of the first and second bus segments 92, 94 together forming a pair of charge lines connected between one of the power converters 72 and one of the charging ports 70. In such arrangement, it may also be desirable for each pair of adjacent second bus segments 94 to also be connected together with a single switch 96B. Further, a switch 98A may be provided between each of the power converters 72 and the respective first bus segment 92, and a switch 98B may be provided between each of the power converters 72 and the respective second bus segment 94. A switch 100A may also be provided between each of the charging ports 70 and the respective first bus segment 92, and a switch 100B may also be provided between each of the charging ports 70 and the respective second bus segment 94.

Figure 10:
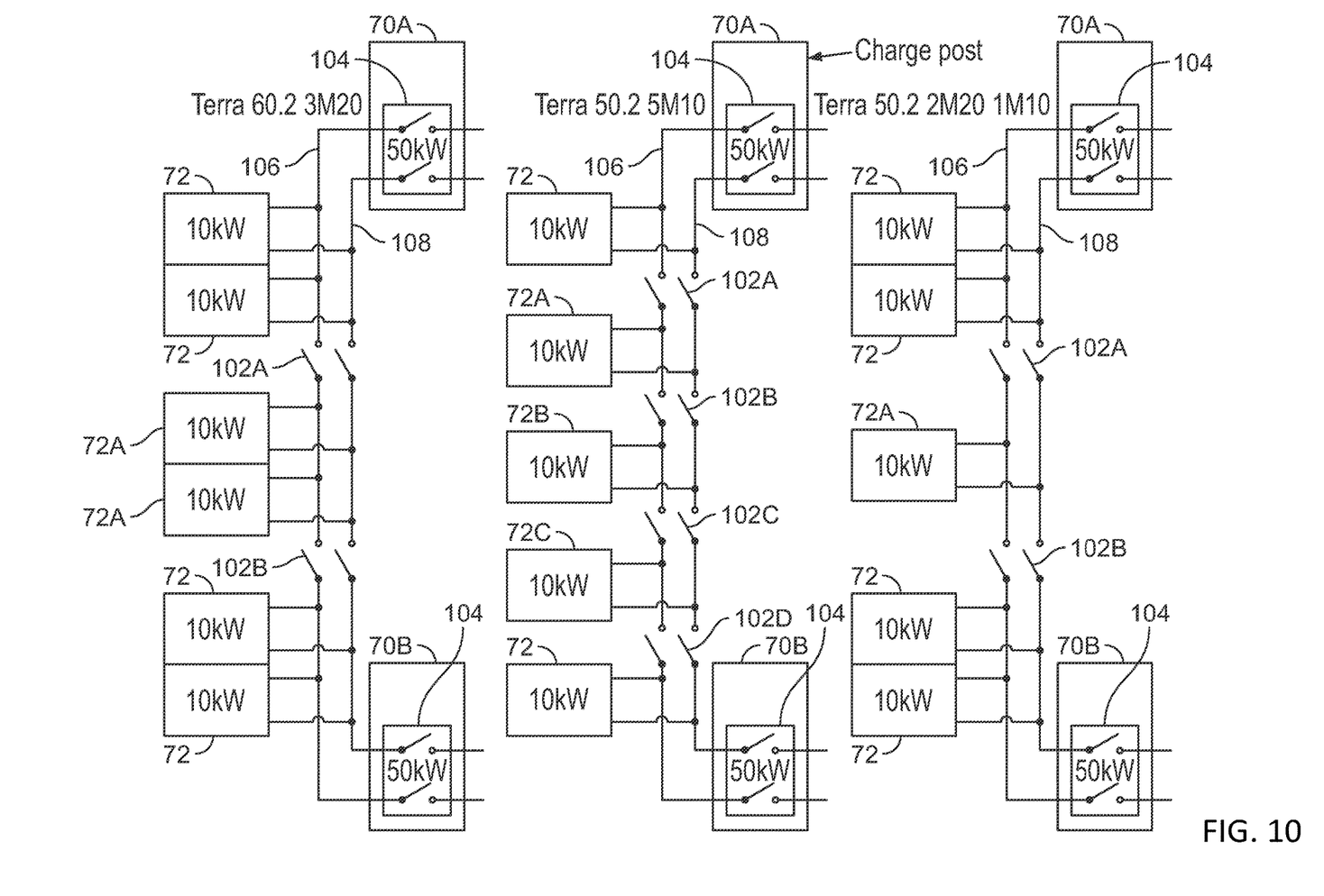
FIG. 10 shows an exemplary implementation of the disclosure.

FIG. 10 shows three configurations of the charging station with two charge posts 70A, 70B in accordance with another exemplary embodiment. For example, as shown in FIG. 10, the first configuration consists of 20 kw modules, the second one of 10 kw modules and the third one can be a combination of both. Each of the converter modules 72 and charge ports 70A, 70B are selectable by the switches 102A, 102B, 102C, 102D. The connection managers are implemented in the charge ports 70A, 70B, and it also includes a couple of switches 104 which are used for selecting the charging ports 70A, 70B. For example, the above mentioned matrix can be distributed over the whole charging configuration. A connection manager can be a device which comprises means for communicating with the electric vehicle and switches for connecting or disconnecting the charge post to the electric vehicle. As shown in FIG. 10, each of the power converters 72 in the charging system may be connected in series to each other between two charging ports 70A, 70B. Additionally, at least one switch 102 may be connected between one of the power converters 72 and one of the charging ports 70A, 70B. Preferably, at least one of the power converters 72A has a switch 102A, 102B connected on both sides of the power converter 72A, such that one switch 102A is between the first charging port 70A and the power converter 72A and another switch 102B is between the second charging port 70B and the power converter 72A. It is also possible to have multiple power converters 72A, 72B, 72C connected in series between the two charge ports 70A, 70B with switches 102A, 102B, 102C, 102D on both sides of each power converter 72A, 72B, 72C. For example, in the second embodiment of FIG. 10, a first switch 102A may be connected between the first power converter 72A and the first charging port 70A. A second switch 102B may also be connected between the first power converter 72A and the second power converter 72B, such that the second power converter 72B is connected between the second switch 102B and the second charging port 70B. A third power converter 72C may also be connected between the second power converter 72B and the second charging port 70B. A third switch 102C may also be connected between the second power converter 72B and the third power converter 72C and a fourth switch 102D may also be connected between the third power converter 72C and the second charging port 70B. Additional power converters 72 may also be combined together or may be located adjacent one of the charging ports 70A, 70B if desired. A pair of charge lines 106, 108 may also be used to connect the power converters 72 in series between the two charging ports 70A, 70B, and corresponding switches 102A, 102B, 102C, 102D may be provided in each of the charge lines 106, 108.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:
1. A charging system for electric vehicles, comprising:
   a plurality of charging ports, each with an interface for power exchange with at least one electric vehicle;

a plurality of power converters for converting power from a power source to a desired format for charging the at least one electric vehicle;

a switchable connection matrix for connecting at least one of the plurality of power converters to at least one of the plurality of charging ports;

wherein the switchable connection matrix comprises a grid of switches with a first number of the switches equal to a number of the plurality of charging ports and a second number of the switches equal to a number of the plurality of power converters, the switchable connection matrix comprising a number of the switches equal to the first number times the second number;

wherein each of the plurality of power converters is connected to one set of the first number of the switches connected to each other in series; and wherein each of the plurality of charging ports is connected to one set of the second number of the switches connected to each other in series.

2. The charging system for electric vehicles according to claim 1, wherein a number of the plurality of charging ports is unequal to a number of the plurality of power converters, the first number of the switches thereby being unequal to the second number of the switches.

3. The charging system for electric vehicles according to claim 1, wherein the switchable connection matrix further comprises a plurality of switch modules equal in number to the number of the switches, wherein each of the plurality of switch modules contains one of the switches.

4. The charging system for electric vehicles according to claim 1, wherein the switches are DC positive switches connected between DC positive outputs of the plurality of power converters and DC positive inputs of the plurality of charging ports.

5. The charging system for electric vehicles according to claim 4, wherein the switchable connection matrix further comprises a grid of DC negative switches connected between DC negative outputs of the plurality of power converters and DC negative inputs of the plurality of charging ports, each of the DC negative switches corresponding to one of the DC positive switches.

6. The charging system for electric vehicles according to claim 5, wherein the switchable connection matrix further comprises a plurality of switch modules equal in number to the number of the switches, wherein each of the plurality of switch modules contains one of the DC positive switches and one of the DC negative switches.

7. The charging system for electric vehicles according to claim 6, wherein a number of the plurality of charging ports is unequal to a number of the plurality of power converters, the first number of the switches thereby being unequal to the second number of the switches.

8. A charging system for electric vehicles, comprising:

a plurality of charging ports, each with an interface for power exchange with at least one electric vehicle;

a plurality of power converters for converting power from a power source to a desired format for charging the at least one electric vehicle;

a switchable connection matrix for connecting at least one of the plurality of power converters to at least one of the plurality of charging ports;

wherein the switchable connection matrix comprises a plurality of first bus segments, each of the plurality of power converters being connected to one of the plurality of charging ports through one of the plurality of first bus segments; and wherein each pair of adjacent first bus segments are connected together with a single switch.

9. The charging system for electric vehicles according to claim 8, wherein the switchable connection matrix further comprises a plurality of second bus segments, each of the plurality of first bus segments and each of the plurality of second bus segments together comprising a pair of charge lines connected between one of the plurality of power converters and one of the plurality of charging ports.

10. The charging system for electric vehicles according to claim 9, wherein each pair of adjacent second bus segments are connected together with a single switch.

11. The charging system for electric vehicles according to claim 8, wherein the switchable connection matrix further comprises a switch between each of the plurality of charging ports and a respective one of the plurality of first bus segments.

12. The charging system for electric vehicles according to claim 8, wherein the switchable connection matrix further comprises a switch between each of the plurality of power converters and a respective one of the plurality of first bus segments.

13. The charging system for electric vehicles according to claim 12, wherein the switchable connection matrix further comprises a plurality of second bus segments, each of the plurality of first bus segments and each of the plurality of second bus segments together comprising a pair of charge lines connected between one of the plurality of power converters and one of the plurality of charging ports.

14. The charging system for electric vehicles according to claim 13, wherein each pair of adjacent second bus segments are connected together with a single switch, and the switchable connection matrix further comprising a switch between each of the plurality of power converters and a respective one of the plurality of second bus segments.

15. The charging system for electric vehicles according to claim 14, wherein the switchable connection matrix further comprises a switch between each of the plurality of charging ports and a respective one of the plurality of first bus segments and a switch between each of the plurality of charging ports and a respective one of the plurality of second bus segments.

16. A charging system for electric vehicles, comprising:

two charging ports, each with an interface for power exchange with at least one electric vehicle;

a plurality of power converters for converting power from a power source to a desired format for charging the at least one electric vehicle;

wherein each of the plurality of power converters is connected in series to each other between the two charging ports; and a first switch connected between at least one of the plurality of power converters and a first one of the two charging ports.

17. The charging system for electric vehicles according to claim 16, further comprising a second switch connected between the at least one of the plurality of power converters and a second one of the two charging ports.

18. The charging system for electric vehicles according to claim 17, wherein the plurality of power converters comprises at least a first power converter and a second power converter, the first switch being connected between the first power converter and the first one of the two charging ports, the second switch being connected between the first power converter and the second power converter, and the second power converter being connected between the second switch and the second one of the two charging ports.

19. The charging system for electric vehicles according to claim 18, wherein the plurality of power converters further comprises a third power converter connected between the second power converter and the second one of the two charging ports, and further comprising a third switch connected between the second power converter and the third power converter and a fourth switch connected between the third power converter and the second one of the two charging ports.

20. The charging system for electric vehicles according to claim 16, wherein the plurality of power converters is connected between the two charging ports with a pair of charge lines, each of the pair of charge lines comprising one of the first switch connected between the at least one of the plurality of power converters and the first one of the two charging ports.

* * * * *